United States Patent

Reinehr et al.

Patent Number: 5,097,076
Date of Patent: Mar. 17, 1992

[54] PHENYLALKYL GLYCIDYL ETHER ADDITION PRODUCTS

[75] Inventors: Dieter Reinehr, Kandern, Fed. Rep. of Germany; Rosemarie Töpfl, Dornach, Switzerland

[73] Assignee: Ciba-Geigy Corporation, Ardsley, N.Y.

[21] Appl. No.: 543,941

[22] Filed: Jun. 26, 1990

[30] Foreign Application Priority Data

Jun. 30, 1989 [CH] Switzerland .................. 2436/89

[51] Int. Cl.⁵ .......................................... C07C 43/164
[52] U.S. Cl. ................................................ 568/607
[58] Field of Search ................................... 568/607

[56] References Cited

U.S. PATENT DOCUMENTS

| | | | |
|---|---|---|---|
| 3,444,242 | 5/1969 | Rue et al. | 568/607 |
| 4,087,466 | 5/1978 | Vanlerberghe | 568/607 |
| 4,894,183 | 1/1990 | Topfle | 252/358 |

FOREIGN PATENT DOCUMENTS

| | | |
|---|---|---|
| 0197001 | 10/1986 | European Pat. Off. . |
| 0256658 | 2/1988 | European Pat. Off. . |
| 0406168 | 1/1991 | European Pat. Off. ............ 568/607 |

*Primary Examiner*—Marianne Cintins
*Assistant Examiner*—Margaret Argo
*Attorney, Agent, or Firm*—George R. Dohmann; Marla Mathias

[57] ABSTRACT

Addition products of phenylalkyl glycidyl ethers to polyalkylene glycol ethers of the formula $$R-O-(\text{Alkylene}-O)_m-H \qquad (1)$$

their acid esters and salts thereof, wherein R is an aliphatic radical having at least 4 carbon atoms, "Alkylene" is an alkylene radical of 2 or 3 carbon atoms, and m is a number from 2 to 100.

These products represent a novel class of non-ionic or anionic surfactants that are used as textile finishing agents, especially as emulsifiers, wetting agents, foaminhibitors or dyeing auxiliaries.

5 Claims, No Drawings

PHENYLALKYL GLYCIDYL ETHER ADDITION PRODUCTS

The present invention relates to novel phenylalkyl glycidyl ether addition products and to their use as textile finishing agents, especially as emulsifiers, wetting agents, foaminhibitors or dyeing auxiliaries.

The phenylalkyl glycidyl ether addition products according to the invention are addition products of phenylalkyl glycidyl ethers to polyalkylene glycol ethers of the formula $$R\text{-}O\text{-}Alkylene\text{-}O)_m H \qquad (1)$$

and their acid esters and salts thereof.

Suitable phenylalkyl glycidyl ethers are benzyl glycidyl ether and phenethyl glycidyl ether.

In formula (1), R is an aliphatic radical having at least 4 carbon atoms. "Alkylene" is an alkylene radical of 2 or 3 carbon atoms, such as ethylene or propylene or combinations thereof. m is a number from 2 to 100, preferably 4 to 80.

The substituent R is advantageously the hydrocarbon radical of an unsaturated or saturated aliphatic monoalcohol having from 4 to 24 carbon atoms. The hydrocarbon radical may be straight-chained or branched. Preferably, R is an alkyl or alkenyl radical having from 8 to 22 carbon atoms.

Suitable aliphatic saturated monoalcohols are natural alcohols, such as, for example, lauryl alcohol, myristyl alcohol, cetyl alcohol, stearyl alcohol, arachidyl alcohol or behenyl alcohol, and synthetic alcohols, for example oxoalcohols, such as, especially, butanol, amyl alcohol, 2-ethylbutanol, 2-methylpentanol, 5-methylheptan-3-ol, 2-ethylhexanol, 1,1,3,3-tetramethylbutanol, octan-2-ol, isononyl alcohol, trimethylhexanol, trimethylnonyl alcohol, decanol, $C_9$-$C_{11}$oxoalcohol, tridecyl alcohol, isotridecanol, or linear primary alcohols (Alfols) having from 8 to 18 carbon atoms. Some representative examples of Alfols are Alfol (8-10), Alfol (9-11), Alfol (10-14), Alfol (12-13) and Alfol (16-18). ("Alfol" is a registered Trade Mark.)

Unsaturated aliphatic monoalcohols are, for example, dodecenyl alcohol, hexadecenyl alcohol and oleyl alcohol.

The alcohol radicals may be present each on its own or in the form of mixtures of two or more components, such as, for example, mixtures of alkyl and/or alkenyl groups derived from soybean fatty acids, palm-kernel fatty acids or tallow oils.

(Alkylene-O)$_m$ chains are preferably of the ethylene glycol, propylene ethylene glycol or ethylene propylene glycol type; the first type is especially preferred.

m is preferably 4 to 40.

The phenylalkyl glycidyl ether addition products are prepared by first etherifying the aliphatic monoalcohol with from 2 to 100 moles of alkylene oxide (ethylene oxide and/or propylene oxide) and then adding 1 mole of phenylalkyl glycidyl ether to the resulting polyalkylene glycol ether. The etherification of the monoalcohol is carried out by methods known per se, using ethylene oxide or propylene oxide, or ethylene oxide and propylene oxide alternately, or mixtures of ethylene oxide and propylene oxide. The phenylalkyl glycidyl ether addition is advantageously effected in a medium virtually free of water or having a low content of water, at a temperature of from 40° to 90° C., with or without pressure and in the presence of an acidic or basic catalyst. Suitable acidic catalysts are phosphoric acid, sulfuric acid or, especially, boron trifluoride etherate. The acid is then removed by neutralisation and filtration. The basic catalysts used are alkali metal hydroxides, for example sodium or potassium hydroxide or sodium ethanolate.

The following may be mentioned as individual examples of the polyalkylene glycol ethers corresponding to formula (1) which are required for the phenylalkyl glycidyl ether addition:

addition product of 2.5 moles of ethylene oxide to 1 mole of $C_9$-$C_{11}$oxoalcohol, addition product of 4 moles of ethylene oxide to 1 mole of $C_9$-$C_{11}$oxoalcohol, addition product of 5 moles of ethylene oxide to 1 mole of $C_9$-$C_{11}$oxoalcohol, addition product of 35 moles of ethylene oxide to 1 mole of stearyl alcohol, addition product of 36 moles of ethylene oxide to 1 mole of stearyl alcohol, addition product of 18 moles of ethylene oxide to 1 mole of $C_{12}$-$C_{18}$ fatty alcohol mixture (Cetalol 50-55), addition product of 10 moles of ethylene oxide to 1 mole of 2-ethylhexanol, addition product of 4 moles of ethylene oxide and 12 moles of propylene oxide to 1 mole of $C_9$-$C_{11}$oxoalcohol, addition product of 8 moles of ethylene oxide and 12 moles of propylene oxide to 1 mole of $C_{12}$-$C_{13}$ fatty alcohol, addition product of 6 moles of ethylene oxide and 6 moles of propylene oxide to 1 mole of $C_9$-$C_{11}$oxoalcohol, addition product of 18 moles of ethylene oxide to 1 mole of cetyl alcohol, addition product of 3 moles of ethylene oxide to 1 mole of isotridecyl alcohol, addition product of 9 moles of ethylene oxide to 1 mole of tridecyl alcohol, addition product of 80 moles of ethylene oxide to 1 mole of oleyl alcohol, addition product of 10 moles of ethylene oxide to 1 mole of tridecyl alcohol, addition product of 20 moles of ethylene oxide to 1 mole of oleyl alcohol, addition product of 3 moles of ethylene oxide to 1 mole of lauryl alcohol, addition product of 2, 4, 6 or 15 moles of ethylene oxide to 1 mole of nonyl alcohol.

Depending on the acid radical, the acid esters may be in the form of monoesters, diesters or semiesters and in the form of free acids or, preferably, in the form of salts, for example alkali metal salts or ammonium salts. Alkali metal salts to be mentioned are especially the sodium, potassium or lithium salts, and ammonium salts to be mentioned are the ammonium, dimethylammonium, trimethylammonium, monoethanolammonium, diethanolammonium and triethanolammonium salts. The acid esters are preferably prepared in the form of ammonium salts. Mono- or di-ethanolammonium salts may be further etherified by from 1 to 25 oxoethylene units.

The acid esters are prepared by reacting the phenylalkyl glycidyl ether addition product of the invention with an at least dibasic oxyacid and, if desired, converting the resulting acid ester into one of the above-mentioned salts.

Polybasic oxyacids that can be used for forming the acid esters are unsubstituted or sulfonated organic, preferably aliphatic, dicarboxylic acids having from 3 to 6 carbon atoms, such as, for example, maleic acid, malonic acid, succinic acid or sulfosuccinic acid, or polybasic inorganic oxyacids, such as, for example, sulfuric acid or orthophosphoric acid. Instead of the acids, their functional derivatives, such as acid anhydrides, acid halides or acid amides, can be used. Examples of these functional derivatives are maleic anhydride, phosphorus pentoxide, chlorosulfonic acid and sulfamic acid. The phosphoric acid esters are advantageously produced in the form of mixtures of a monoester and a diester.

The esterification is normally performed by simply mixing the reactants while heating, advantageously to a temperature of from 50° to 100° C. The free acids produced initially can subsequently be converted into the corresponding alkali metal or ammonium salts. The conversion into the salts is effected in customary manner by adding bases, such as, for example, ammonia, monoethanolamine, triethanolamine or alkali metal hydroxides, for example sodium or potassium hydroxide. According to an especially preferred procedure, acid sulfuric acid esters are prepared directly in the form of their ammonium salts by heating the phenylalkyl glycidyl ether addition products with sulfamic acid advantageously in the presence of urea.

Phenylalkyl glycidyl ether addition products that are of practical importance have the formula

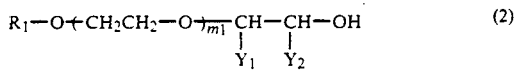

$$R_1-O+CH_2CH_2-O)_{\overline{m_1}}CH-CH-OH \qquad (2)$$
$$\phantom{R_1-O+CH_2CH_2-O)_{\overline{m_1}}}\mid\phantom{xx}\mid$$
$$\phantom{R_1-O+CH_2CH_2-O)_{\overline{m_1}}}Y_1\phantom{x}Y_2$$

wherein $R_1$ is alkyl or alkenyl each having from 8 to 22 carbon atoms, one of $Y_1$ and $Y_2$ is benzyloxymethylene or phenethyloxymethylene and the other is hydrogen, and $m_1$ is 4 to 80.

Preferred acid esters prepared with an inorganic or organic acid have the formula

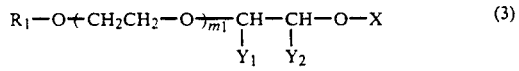

$$R_1-O+CH_2CH_2-O)_{\overline{m_1}}CH-CH-O-X \qquad (3)$$
$$\phantom{R_1-O+CH_2CH_2-O)_{\overline{m_1}}}\mid\phantom{xx}\mid$$
$$\phantom{R_1-O+CH_2CH_2-O)_{\overline{m_1}}}Y_1\phantom{x}Y_2$$

or the formula

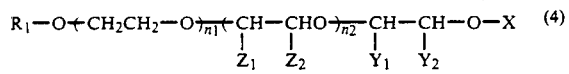

$$R_1-O+CH_2CH_2-O)_{\overline{n_1}}(CH-CHO)_{\overline{n_2}}CH-CH-O-X \qquad (4)$$
$$\phantom{xxxxxxxxxxxxxxxxx}\mid\phantom{xx}\mid\phantom{xxxx}\mid\phantom{xx}\mid$$
$$\phantom{xxxxxxxxxxxxxxxxx}Z_1\phantom{x}Z_2\phantom{xxxx}Y_1\phantom{x}Y_2$$

wherein $R_1$, $Y_1$, $Y_2$ and $m_1$ are as defined above, one of $Z_1$ and $Z_2$ is methyl and the other is hydrogen, X is the maleic acid, sulfosuccinic acid, sulfuric acid or phosphoric acid radical, and the sum of $n_1+n_2$ is 4 to 30, preferably 6 to 18.

Especially preferred acid esters of formulae (3) and (4) contain either a maleic acid ester group or a sulfuric acid ester group, each being preferably in the form of one of its alkali metal salts or ammonium salts.

Phenylalkyl glycidyl ether addition products according to the invention are suitable for various uses in the textile application, such as, for example, pretreatment, dyeing or finishing. Nonionic unesterified products are used especially as auxiliaries when dyeing wool-containing fibre materials with anionic dyes or dye mixtures. The corresponding acid esters, especially the dicarboxylic acid semiesters or sulfuric acid esters, on the other hand, are used primarily as wetting agents and foaminhibitors for aqueous systems, especially when dyeing natural or synthetic fibre material and more especially when dyeing cellulose textile materials, polyester fibres or natural or synthetic polyamide fibre materials. When used in the described formulations, both in the form of non-ionic products and in the form of acid esters, phenylalkyl glycidyl ether addition products according to the invention improve the absorption affinity of the dyes and thereby accelerate the diffusion of the dyes in the fibres.

The present invention accordingly relates also to a method of finishing natural or synthetic fibre material with or without corresponding dyes, which comprises carrying out the finishing in the presence of the phenylalkyl glycidyl ether addition products according to the invention.

The amounts in which the phenylalkyl glycidyl ether addition products according to the invention are added to the processing baths, such as, for example, dye baths or pretreatment or after-treatment baths, vary, depending on the substrate, advantageously from 0.5 to 20 g, preferably from 1 to 10 g, per liter of bath.

Advantageous applications of the phenylalkyl glycidyl ether addition products according to the invention comprise using them as non-ionic and/or as ionic products with or without water in combination with non-ionic or anionic dispersants, fatty alcohols, fatty acid amides, alkylene bis-fatty acid amides, alkenyldicarboxylic acid alkyl esters, metal stearates, silicone oils, for example dialkylpolysiloxanes, or also mineral oils or alkanolamines in stable, wetting and/or foaminhibiting formulations. Such preparations are additionally distinguished by an ability to de-aerate aqueous systems virtually completely. It is therefore possible to avoid inclusions of air both in the application baths and in the substrates. As a result of such de-aeration it is possible to prevent flecking in dyeing and finishing operations.

Preferred are aqueous or water-free preparations that, based on the entire preparation, comprise (A) from 2 to 50% by weight of an acid ester of the addition product of phenylalkyl glycidyl ether to a polyalkylene glycol ether of formula (1), (B) from 5 to 50% by weight of a non-ionic surfactant, preferably an aliphatic monoalcohol having from 6 to 22 carbon atoms or an addition product of from 2 to 80 moles of ethylene oxide to 1 mole of an aliphatic monoalcohol having from 6 to 22 carbon atoms or a polyoxyethylene derivative of a sorbitan fatty acid ester or a phenylalkyl glycidyl ether addition product of formula (2) or mixtures thereof and at least one of the following components:

(C) from 1 to 30% by weight of a silicone oil, for example a dialkylpolysiloxane, such as dimethylpolysiloxane, (D) from 10 to 60% by weight of a mineral oil, for example paraffin oil, such as Shell Oil L 6189 or Esso 301-312 mineral oils, (E) from 20 to 45% by weight of a dialkyl ester of an ethylenically unsaturated aliphatic dicarboxylic acid, for example maleic acid bis-2-ethylhexyl ester, citraconic acid bis-2-ethylhexyl ester, (F) from 10 to 70% by weight of a diffusion accelerator, especially an aliphatic or aromatic carboxylic acid ester, such as lactic acid alkyl ester, benzoic acid alkyl ester, benzoic acid phenyl ester or benzoic acid benzyl ester, or an alkylbenzene, such as trimethylbenzene or ethylbenzene, (G) from 0.5 to 5% by weight of a salt of a $C_{10}$-$C_{24}$ fatty acid and a polyvalent metal, such as, for example, magnesium distearate, calcium dibehenate or aluminium tristearate and (H) from 0.5 to 3% by weight of a $C_1$-$C_4$ alkylene diamide of a fatty acid having from 10 to 24 carbon atoms, such as, for example, methylene-bis-stearic acid amide, ethylene-bis-stearic acid amide and ethylene-bis-behenic acid amide.

In the following Preparation Examples and Use Examples, all percentages are by weight unless indicated to the contrary; parts are parts by weight. The amounts refer, in the case of the dyes, to commercial, i.e. diluted, products and, in the case of the auxiliaries, to the pure substance.

PREPARATION EXAMPLES

EXAMPLE 1

120 g of the addition product of 6 moles of ethylene oxide to 1 mole of isononyl alcohol (OH number=140) are mixed with 2.4 g of sodium hydroxide and, after the addition of 49.2 g of benzyl glycidyl ether, the mixture is heated to 95°-100° C. Stirring is subsequently carried out for 1 hour at 100° C. and then for 2 hours at 120° C., to produce a yellowish, clear product of the formula $$R-O-(CH_2-CH_2-O)_6 CH_2-CH(OH)-CH_2-O-CH_2-\text{Ph} \quad (101)$$

R=isononyl radical (OH number=108).

EXAMPLE 2

0.3 g of boron trifluoride etherate is added at 50° C. to 66.3 g of an addition product of 4 moles of ethylene oxide to 1 mole of $C_9$-$C_{11}$ oxoalcohol (OH number=169). 32.8 g of benzyl glycidyl ether are then added dropwise in 30 minutes, the temperature rising to 84° C. Stirring is carried out for 15 minutes at 80° C. The reaction product, which corresponds to formula (102), is thinly liquid and clear.

$$R-O-(CH_2-CH_2-O)_4 CH_2-CH(OH)-CH_2-O-CH_2-\text{Ph} \quad (102)$$

R=$C_9$-$C_{11}$ oxoalcohol radical (OH number=118).

EXAMPLE 3

71 g of the reaction product obtained according to Example 2 are heated together with 14.7 g of maleic anhydride (0.15 mol) and 0.9 g of tri-n-butylamine to 70° C., and the mixture is subsequently stirred for 1 hour at 70° C., then heated to 90° C. and stirred at 90° C. for 4 hours to yield a brown-coloured, medium-viscosity product. Acid number=100 (theoretical acid number:98).

EXAMPLE 4

410 g of an addition product of 36 moles of ethylene oxide to 1 mole of $C_{16}$-$C_{18}$ fatty alcohol (OH number=32) are melted at 70° C. and 4.1 g of boron trifluoride etherate are then added thereto. 38.4 g of benzyl glycidyl ether are then added dropwise within 30 minutes, the temperature rising to 81° C. Stirring is carried out for 1 hour at 80° C. The reaction product, which corresponds to formula (103), is a wax-like solid at room temperature.

$$R-O-(CH_2-CH_2-O)_{36} CH_2-CH(OH)-CH_2-O-CH_2-\text{Ph} \quad (103)$$

R=$C_{16}$-$C_{18}$ fatty alcohol radical (OH number=29.5).

EXAMPLE 5

0.5 g of boron trifluoride etherate is added at 50° C. to 96.6 g of an addition product of 8 moles of ethylene oxide to 1 mole of $C_9$-$C_{11}$ oxoalcohol (OH number=116). 32.8 g of benzyl glycidyl ether are then added dropwise within 30 minutes, the temperature rising to 86° C. Stirring is carried out for 15 minutes at 80° C. The reaction product, which corresponds to formula (104), is thinly liquid and slightly turbid.

$$R-O-(CH_2-CH_2-O)_8 CH_2-CH(OH)-CH_2-O-CH_2-\text{Ph} \quad (104)$$

R=$C_9$-$C_{11}$ oxoalcohol radical (OH number=112).

EXAMPLE 6

0.44 g of boron trifluoride etherate is added at 50° C. to 88.9 g of an addition product of 4 moles of ethylene oxide to 1 mole of $C_9$-$C_{11}$ oxoalcohol (OH number=160). 42.8 g of phenethyl glycidyl ether are then added dropwise in 35 minutes, the temperature rising to 71° C. Stirring is carried out for 50 minutes at 80° C. The reaction product, which corresponds to formula (105), is thinly liquid and clear.

$$R-O-(CH_2-CH_2-O)_8 CH_2-CH(OH)-CH_2-O-CH_2-CH_2-\text{Ph} \quad (105)$$

R=$C_9$-$C_{11}$ oxoalcohol radical (OH number=110).

USE EXAMPLE

EXAMPLE 7

100 parts of a polyester textile are added to a dye bath having a temperature of 60° C. that contains 1300 parts of water, 2 g/l ammonium sulfate, 2.5 parts of a dye of the formula (106) [structure of dye with Cl, NO₂, NO₂ substituents on benzene ring, N=N azo linkage, pyrimidine ring with HN-Ph, NH-CH₂CH₃, and HN-CH₂CH₂OH groups]

and 2 parts of an auxiliary formulation consisting of
16 parts of the maleic acid semiester prepared according to Example 3, 24 parts of the addition product of 18 moles of ethylene oxide to 1 mole of a $C_{12}$–$C_{19}$ fatty alcohol mixture and 60 parts benzoic acid benzyl ester, and that has been adjusted to pH 5 with formic acid. The temperature of the bath is increased over the course of 30 minutes to 130° C. and dyeing is carried out at that temperature for 60 minutes.

The bath is then cooled to 70° C. and discharged, and the article is rinsed. A level red-dyed article that is fast to rubbing is obtained without the customary reductive final cleaning and with a high dye yield.

The auxiliary formulation used in this Example is prepared as follows: In a heatable stirred vessel, 60 parts of benzoic acid benzyl ester are heated to 60° C. with constant stirring and then 24 parts of the addition product of 18 moles of ethylene oxide to 1 mole of a $C_{12}$–$C_{19}$ fatty alcohol mixture and 16 parts of the maleic acid semiester prepared according to Example 3 are stirred in. After cooling to room temperature, a formulation is obtained that is stable to storage and that is especially suitable for use in the dyeing of polyester fibers.

What is claimed is:

1. An addition product of a phenylalkyl glycidyl ether with a polyalkylene glycol ether of the formula R-O-Alkylene-O)$_m$H  (1)

wherein the phenylalkyl glycidyl ether is benzyl glycidyl ether or phenethyl glycidyl ether, R is an aliphatic hydrocarbon radical having at least 4 carbon atoms, "Alkylene" is an alkylene radical of 2 or 3 carbon atoms, and m is a number from 2 to 100.

2. A phenylalkyl glycidyl ether addition product according to claim 1, wherein in formula (1) R is an alkyl or alkenyl radical of from 8 to 22 carbon atoms.

3. A phenylalkyl glycidyl ether addition product according to claim 1, wherein in formula (1) "Alkylene" is ethylene.

4. A phenylalkyl glycidyl ether addition product according to claim 1, wherein in formula (1) m is 4 to 40.

5. A phenylalkyl glycidyl ether addition product according to claim 1 which corresponds to the formula $$R_1-O(CH_2CH_2-O)_{\overline{m_1}}CH-CH-OH \quad (2)$$
$$\phantom{R_1-O(CH_2CH_2-O)_{\overline{m_1}}}\ \ |\quad\ \ |$$
$$\phantom{R_1-O(CH_2CH_2-O)_{\overline{m_1}}}\ Y_1\ \ Y_2$$

wherein $R_1$ is alkyl or alkenyl each having from 8 to 22 carbon atoms, one of $Y_1$ and $Y_2$ is benzyloxymethylene or phenethyloxymethylene and the other is hydrogen, and $m_1$ is 4 to 80.

* * * * *